United States Patent
Siviter et al.

(10) Patent No.: US 7,425,261 B2
(45) Date of Patent: Sep. 16, 2008

(54) STORMWATER BIORETENTION FILTRATION SYSTEM WITH OVERFLOW/BYPASS CAPABILITY

(75) Inventors: Terry Lee Siviter, Virginia Beach, VA (US); Brian Richard Hofe, Martinsburg, WV (US); Edward Stuart Kay, Beaverdam, VA (US); Larry S. Coffman, Bowie, MD (US)

(73) Assignee: Americast, Inc., Ashland, VA (US)

( * ) Notice: Subject to any disclaimer, the term of this patent is extended or adjusted under 35 U.S.C. 154(b) by 85 days.

(21) Appl. No.: 11/417,220

(22) Filed: May 4, 2006

(65) Prior Publication Data

US 2007/0256966 A1 Nov. 8, 2007

(51) Int. Cl.
*C02F 3/32* (2006.01)
(52) U.S. Cl. .................. 210/150; 210/163; 210/170.03; 210/254
(58) Field of Classification Search ................. 210/162, 210/163, 164, 254, 170.03, 150, 151, 532.1
See application file for complete search history.

(56) References Cited

U.S. PATENT DOCUMENTS

| | | | | |
|---|---|---|---|---|
| 3,770,623 A | * | 11/1973 | Seidel | 210/151 |
| 5,096,576 A | * | 3/1992 | Szabo | 210/150 |
| 5,322,629 A | * | 6/1994 | Stewart | 210/170.03 |
| 5,460,722 A | * | 10/1995 | Chen | 210/150 |
| 5,725,760 A | * | 3/1998 | Monteith | 210/170.03 |
| 5,746,911 A | * | 5/1998 | Pank | 210/170.03 |
| 6,077,448 A | * | 6/2000 | Tran-Quoc-Nam et al. | 210/254 |
| 6,277,274 B1 | | 8/2001 | Coffman | |
| 6,524,473 B2 | * | 2/2003 | Williamson | 210/170.03 |
| 6,569,321 B2 | | 5/2003 | Coffman | |
| 6,783,683 B2 | * | 8/2004 | Collings | 210/170.03 |
| 6,869,528 B2 | * | 3/2005 | Pank | 210/170.03 |
| 7,022,243 B2 | * | 4/2006 | Bryant | 210/170.03 |
| 2007/0241052 A1 | * | 10/2007 | Swift | 210/532.1 |

OTHER PUBLICATIONS

Coffman, et al., "An Advanced Sustainable Stormwater Treatment System", Filterra® by Americast, pp. 1-10, no date.

* cited by examiner

*Primary Examiner*—Christopher Upton
(74) *Attorney, Agent, or Firm*—Jacobson Holman PLLC

(57) ABSTRACT

A stormwater treatment system including a substantially water impermeable treatment container for treating stormwater through a bioretention mechanism. The treatment container includes an overflow/bypass opening to receive stormwater that bypasses the treatment container filter media, or is only partially treated as a result of high stormwater flows in excess of the capacity of the container to treat the stormwater. The stormwater is directed into the container through an inlet, such as an inlet pipe, preferably connected to a roof drain system for processing and treating stormwater from the roof of a building. The overflow/bypass opening may be adjacent the top wall or bottom wall of the container.

8 Claims, 7 Drawing Sheets

SECTION VIEW

SECTION VIEW

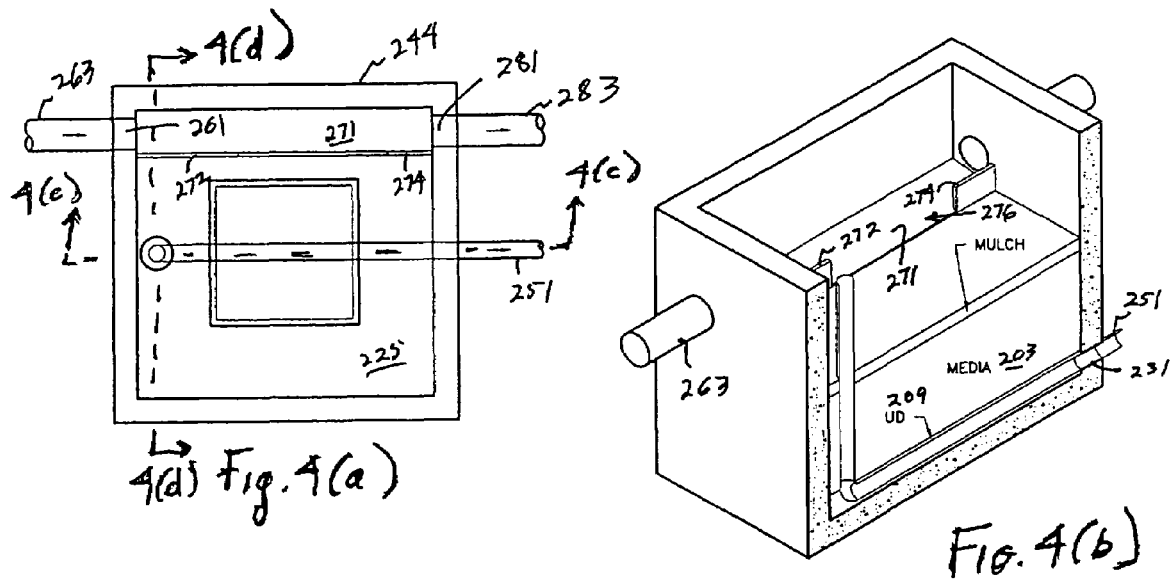
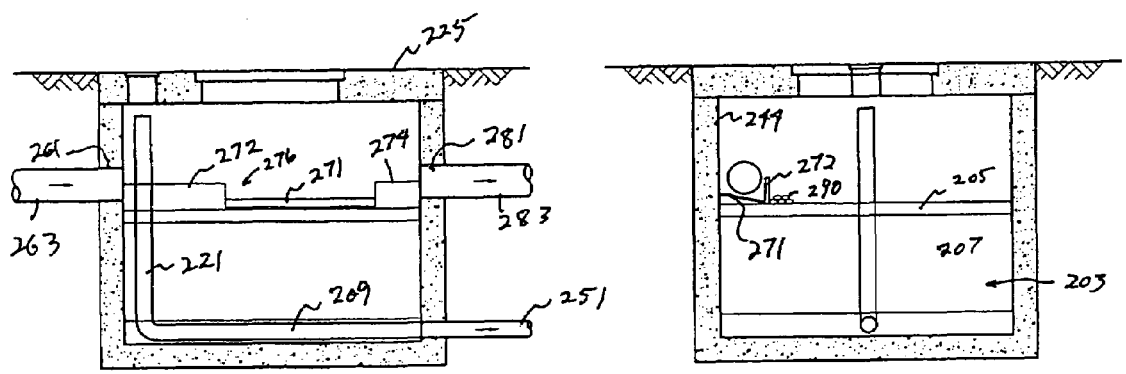
Fig. 4(a)   Fig. 4(b)   Fig. 4(c)   Fig. 4(d)

PLAN VIEW

SECTION VIEW

SECTION VIEW

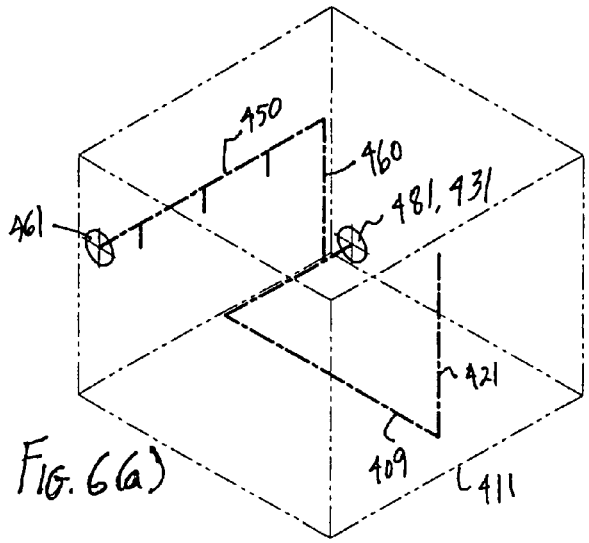
Fig. 6(a)
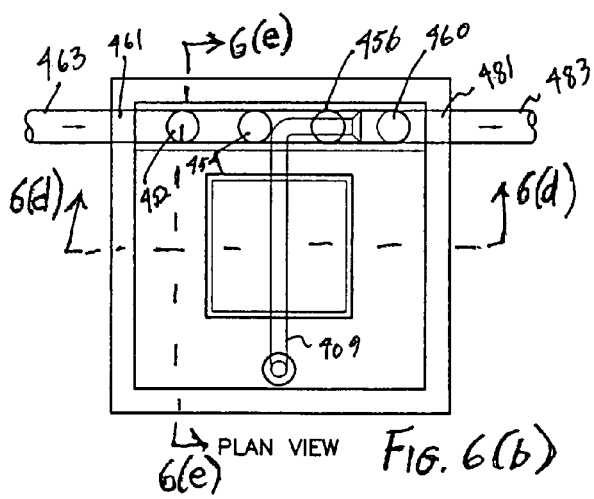
Fig. 6(b) PLAN VIEW
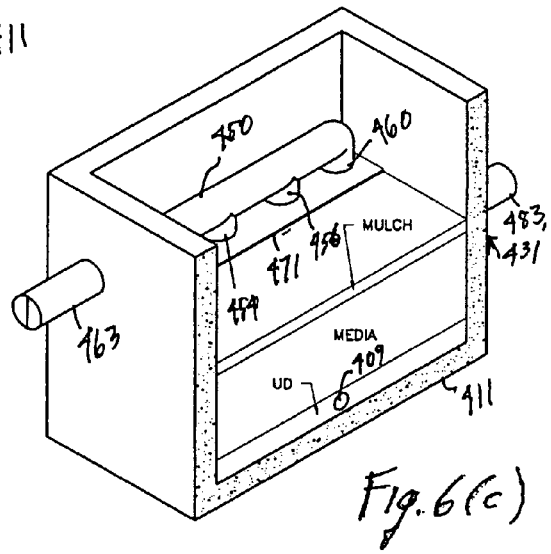
Fig. 6(c)
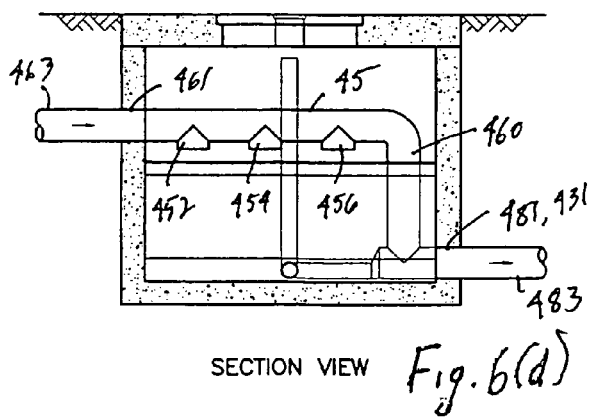
SECTION VIEW Fig. 6(d)
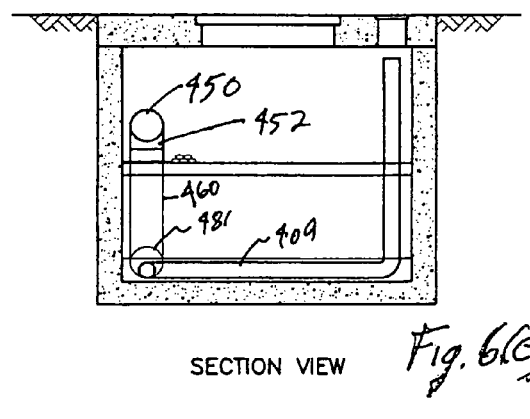
SECTION VIEW Fig. 6(e)

STORMWATER BIORETENTION FILTRATION SYSTEM WITH OVERFLOW/BYPASS CAPABILITY

BACKGROUND OF THE INVENTION

1. Field of the Invention

A stormwater filtration system having overflow/bypass capability forms the subject of the present invention. The stormwater filtration system includes a treatment container with a filter media that treats stormwater runoff through bioretention. Bioretention is the filtering of stormwater runoff through a terrestrial aerobic plant/soil/microbe complex to capture, remove, and cycle pollutants. The container includes an inlet opening, an overflow/bypass outlet pipe opening, as well as an underdrain pipe and pipe opening. The underdrain pipe receives the treated stormwater that flows downwardly through the filter media. The overflow/bypass outlet pipe opening receives primarily untreated stormwater attributed to high stormwater flow rates. The inlet opening receives the stormwater that filters through the filter media and passes to the overflow/bypass outlet pipe opening when high stormwater flow is received. The stormwater filtration system is particularly appropriate for receiving stormwater from building roof drain structures, such as vertically oriented drainage pipes that interconnect with the inlet opening.

2. Description of the Related Art

Stormwater bioretention treatment systems are known in the art. Such systems are described in U.S. Pat. Nos. 6,277,274 and 6,569,321, exclusively licensed to the assignee of this application, and incorporated herein in their entirety by reference. Such systems have been commercialized by Americast, Inc. and marketed under the FILTERRA® trademark. Further details of the FILTERRA® system may be obtained from the Americast, Inc. website at www.filterra.com. There, an article entitled "An Advanced Sustainable Stormwater Treatment System" authored by Larry S. Coffman and Terry Siviter is available that further describes a prior art FILTERRA® system. The article is also incorporated by reference herein.

The prior FILTERRA® system includes a water impermeable treatment container having an underdrain pipe embedded near the bottom of the container. The container contains filter media, including a layer of mulch overlying a soil mixture. Live plants grow in the filter media and extend out through a top opening. The container is positionable below ground and typically located adjacent a roadway or parking lot through a cutout in the curb. Stormwater runoff from the roadway collects pollutants which are treated in the container. The underdrain pipe is connected to an outlet that flows into the storm sewer drainage system, either directly or first through a catch basin.

Stormwater runoff from building roof drains also results in stormwater pollution problems. Stormwater runoff from the roofs of buildings is drained through downspouts or through vertically oriented pipe systems directly into the ground where the pollutants can seep into the ground without treatment. A need has thus arisen for treating the stormwater runoff from building roofs.

Treatment of stormwater runoff at high flow rates also poses a problem. When the flow rates are high, in excess of the capacity of the stormwater treatment container, the excess capacities will simply overflow the treatment container. Thus, a need has arisen to permit high stormwater runoff to overflow or bypass the treatment container filtration media.

SUMMARY OF THE INVENTION

The present invention relates to a stormwater treatment system including a stormwater treatment container with bioretention capability. The stormwater treatment container includes a substantially water impermeable container having a bottom wall, sidewalls, and a top at least partially open to the atmosphere. The top includes a slab of water impermeable material having a substantially central opening through which plant material grows. The container includes filter media, including a layer of mulch overlying a soil mixture that includes a combination of organic and non-organic material that supports the growth of live plant material in the filter media. Embedded within the media is an underdrain pipe that receives the treated stormwater as it seeps through the media toward the bottom of the container. Treated stormwater passes through the underdrain pipe, through an underdrain pipe opening in the sidewall to a pipe that connects with the storm drain or sewer system.

The present invention includes a bypass or overflow outlet pipe that also leads to the storm drain or sewer system. Stormwater that enters the container at high flow rates in excess of container treatment capacity can overflow or bypass the filter media and exit through the overflow/bypass outlet pipe through the sidewall. The term(s) "overflow/bypass" or "overflow/bypass outlet pipe" are defined broadly to encompass a condition where high inlet stormwater flows that are in excess of the capacity of the treatment container to treat the stormwater will result in some of the stormwater to bypass the filter media entirely or permit some of the treated stormwater or partially treated stormwater to overflow the media. (That is, the water that flows out of the outlet pipe opening may be a combination of both bypass, overflow, or may be only one of the two conditions.)

Preferably, stormwater enters the container through an inlet opening located in an upper portion of the container side wall, the inlet opening communicating with the overflow/bypass pipe opening, as well as permitting stormwater to pass through the filter media for treatment. The stormwater inlet opening is connected with a stormwater inlet pipe that, in turn, is connected with a roof drain structure that receives stormwater from the roof of a building. The overflow/bypass outlet pipe opening can be located in an upper portion of the container substantially level with the inlet pipe opening or, alternatively, the overflow/bypass outlet pipe opening can be located adjacent the bottom wall of the container and may be combined with the underdrain pipe outlet opening. In such case, all of the stormwater entering the treatment container, both overflow or bypass untreated stormwater and treated stormwater, will exit the container through a common outlet opening.

It is an object of the present invention to provide a stormwater bioretention treatment container having the capability of enabling stormwater entering at high flow rates in excess of treatment capacity to overflow or bypass the filtration media. It is further an object of the present invention to provide a stormwater bioretention treatment chamber having an inlet pipe, such as those connected to a roof drain structure for receiving stormwater from the roof of a building.

Still further, it is an object of the present invention to have a stormwater treatment chamber with bioretention capability wherein the stormwater to be treated first flows onto a dissipation plate prior to falling onto the filter media. It is yet another object of the present invention to provide a separate collection chamber associated with the wall of the treatment container wherein both treated and untreated water exits from the main treatment chamber into the collection chamber prior to passing out into the storm drain system.

Other and further objects of the present invention will become apparent from the ensuing description and claims read in conjunction with the attached drawings.

BRIEF DESCRIPTION OF THE DRAWINGS

FIGS. 4(a), 4(b), 4(c) and 4(d) is a plan view, a cutaway perspective view, and two section views, respectively, of a second embodiment of a stormwater treatment container of the present invention.

FIGS. 6(a), 6(b), 6(c), 6(d) and 6(e) is a schematic perspective view, a plan view, a cutaway perspective view, and two section views, respectively, of a fourth embodiment of a stormwater treatment container of the present invention.

DETAILED DESCRIPTION OF THE PREFERRED EMBODIMENTS

Figure 1:
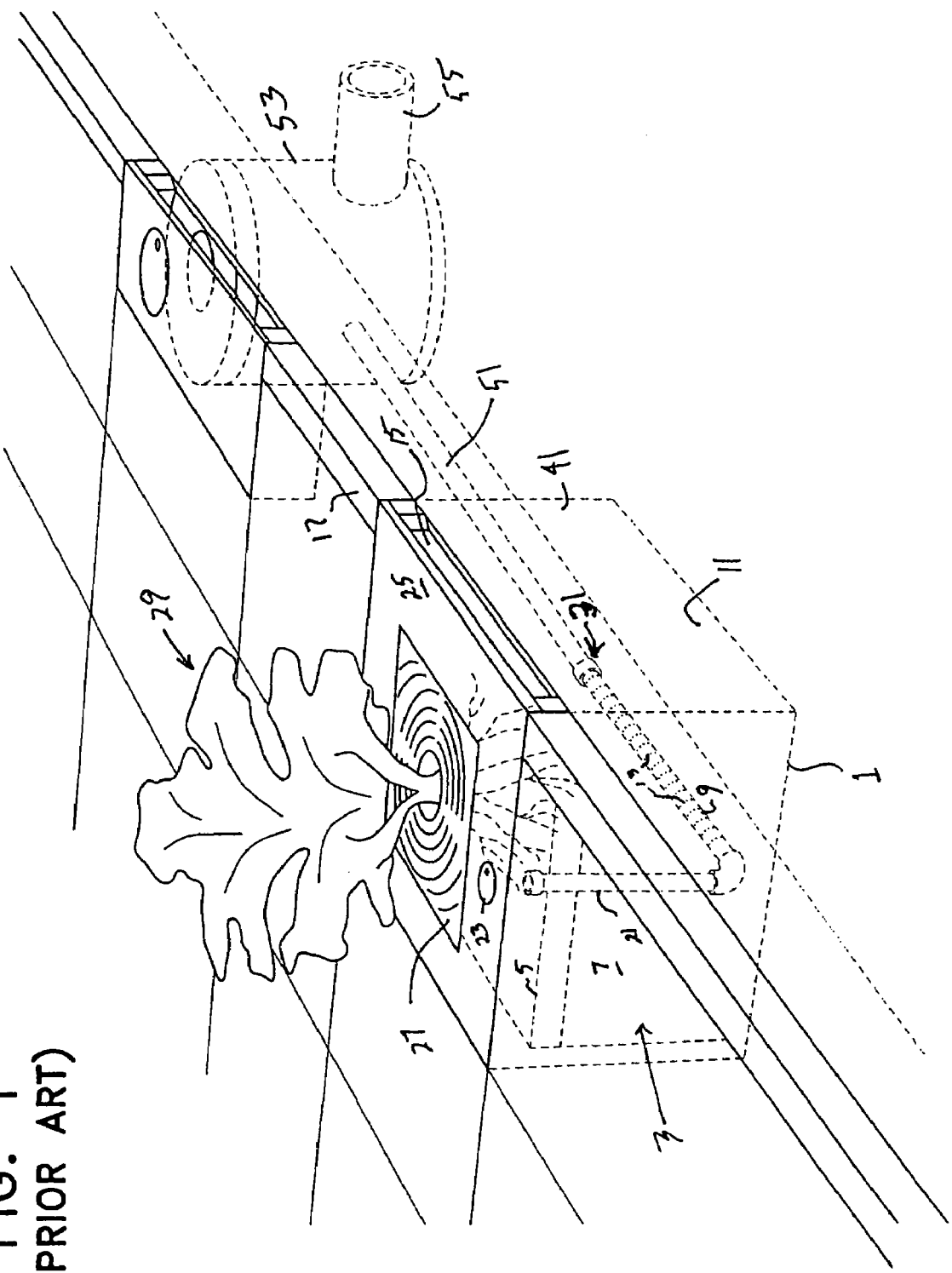
FIG. 1 is a perspective view of a prior art stormwater bioretention filtration system.

In describing the preferred embodiments of the invention illustrated in the drawings, specific terminology will be used for the sake of clarity. However, the invention is not intended to be limited to the specific terms so selected and it is to be understood that each specific term includes all technical equivalents which operate in a similar manner to accomplish a singular purpose.

Referring now to the drawings and, specifically, FIG. 1, a prior art stormwater bioretention filtration system of the type disclosed in U.S. Pat. Nos. 6,277,274 and 6,569,321 (FIGS. 2 and 6, specifically) is depicted (hereinafter, the "Coffman patents"). This prior art system has been commercialized as the FILTERRA® stormwater bioretention filtration system by Americast, Inc. The prior art system includes a substantially water impermeable container 1, preferably of concrete, which holds filter media 3, including a mulch layer 5 overlying soil mixture 7 of the type described in the Coffman patents incorporated by reference herein. A stormwater underdrain pipe 9 is provided adjacent the bottom 11 having a plurality of openings 13 that receive the stormwater as it is filtered through the media. Incoming stormwater flows through, in this example, a cutout 15 in a curb 17 adjacent a roadway and the stormwater seeps through the filter media 3 into the underdrain pipe 9. Associated with the underdrain pipe 9 is a vertical cleanout pipe 21 (as described in the Coffman patents) that is accessible through a cleanout plate 23 positioned in the top slab 25 of the treatment container 1. The cleanout pipe is optional. Located substantially centrally in the top slab 25 is a tree grate 27 through which plant material, such as a plant or tree 29, can grow therethrough. The plant material 29, along with the filter media 7 that preferably comprises a non-organic matrix material and an organic matrix material including topsoil, provides for the filtering of the stormwater runoff to capture, remove and cycle pollutants through a variety of physical, chemical and biological processes as described in the Coffman patents incorporated by reference herein, as well as in the publication "An Advanced Sustainable Stormwater Treatment System" authored by Coffman et al., as found on the website www.filterra.com also incorporated by reference herein.

As shown in FIG. 1, the underdrain pipe 9 is connected through an underdrain pipe opening 31 in a sidewall 41 to a drainpipe 51 that, in the example depicted, goes to a separate catch basin 53 prior to entering the storm drainpipe or sewer pipe 55. The use of a catch basin is optional. No bypass or overflow line is provided out of the container. When high stormwater flows are received, the high flow will merely pass on the street level into the catch basin 53 from the street.

The concrete container 1 and treatment media 7 as shown in FIG. 1 are below grade with the only features visible being the concrete top slab 25, the tree grate 27, the plant 29, and inlet opening 15 off of the curb 17.

The commercial FILTERRA® container size may vary from 4'×6' to 6'×12'. The mulch layer is typically 3" and the soil mixture height is typically 1.5' to 3.5'.

Figure 2:
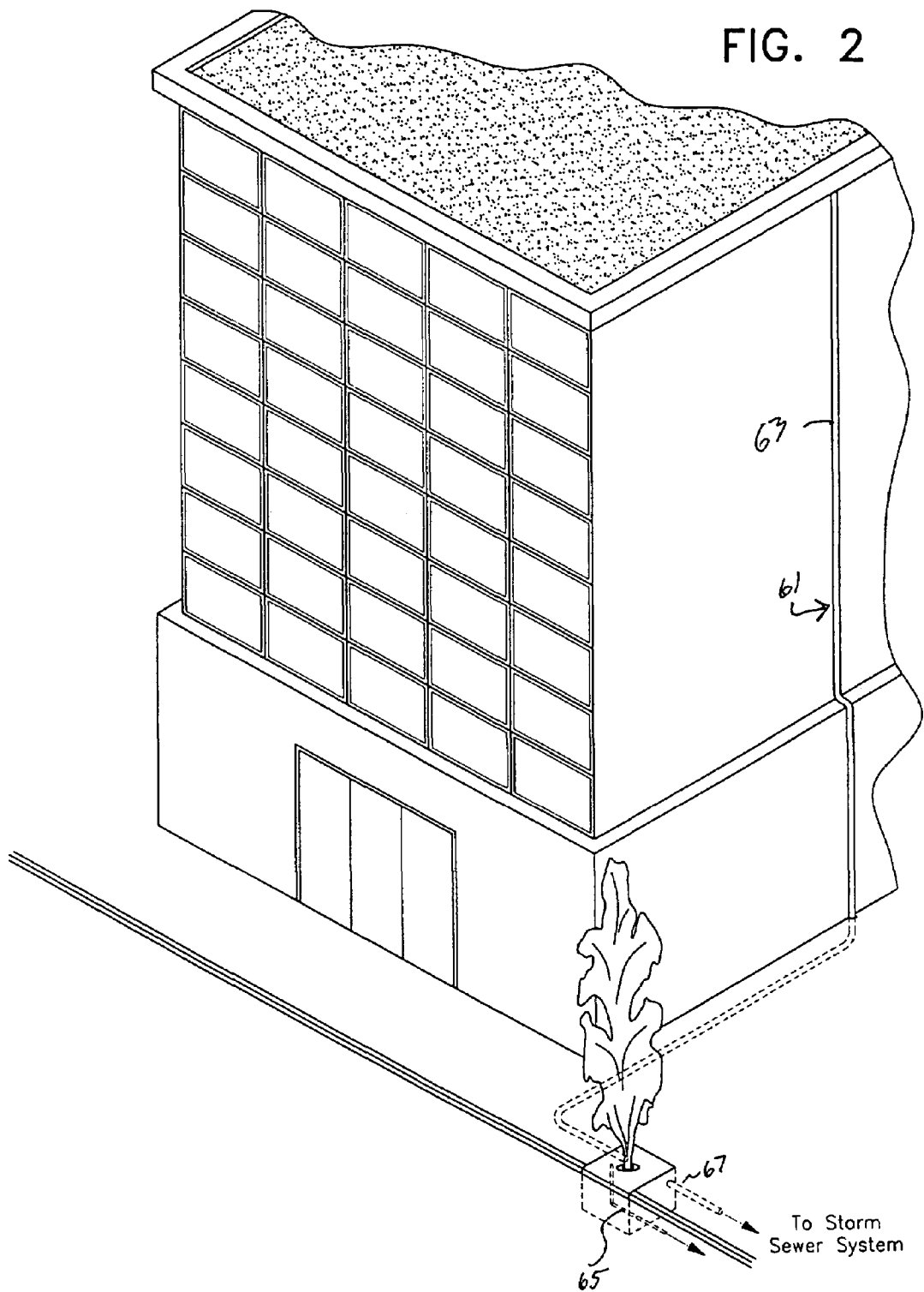
FIG. 2 is a stormwater bioretention filtration system of the present invention including a treatment container shown schematically interconnected with a roof drain structure to receive stormwater runoff from a building roof.
Figure 3A:
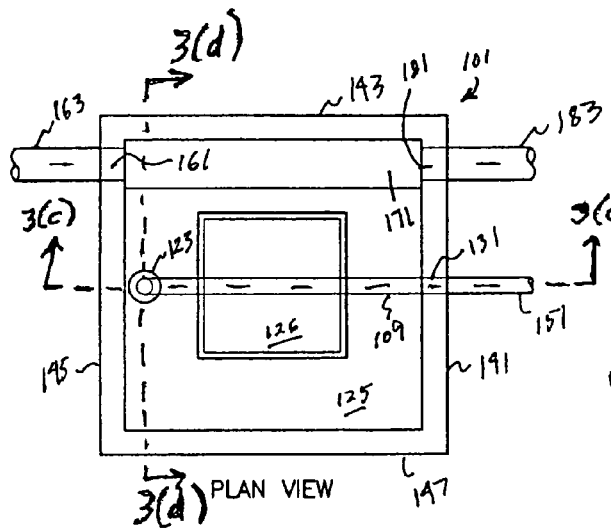
FIGS. 3(a), 3(b), 3(c) and 3(d) is a plan view, cutaway perspective view, and two section views, respectively, of a first embodiment of a stormwater treatment container of the present invention.
Figure 3B:
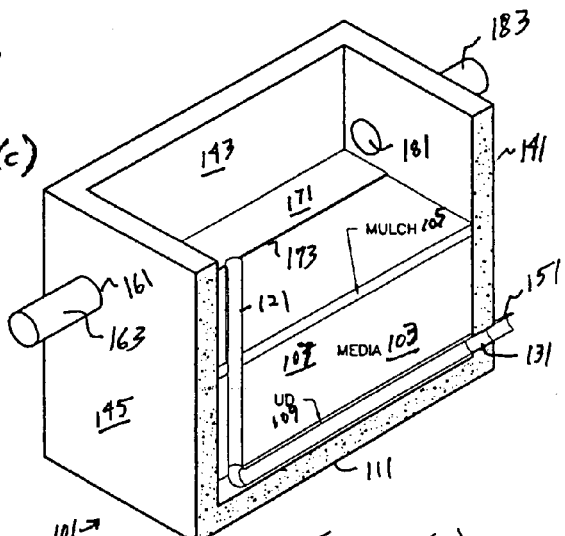
Figure 3C:
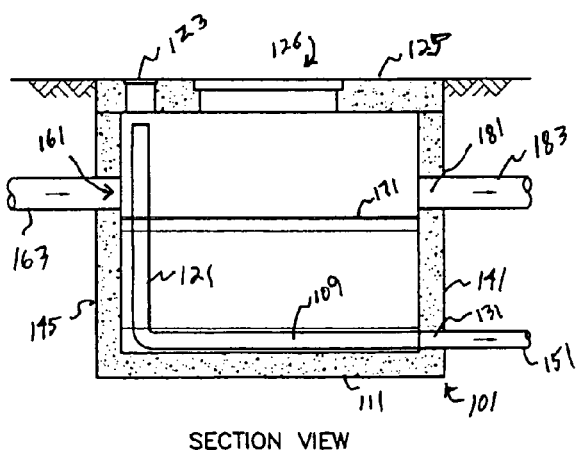
Figure 3D:
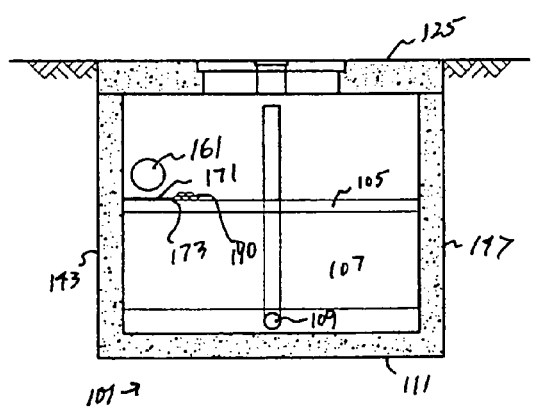
Figure 5A:
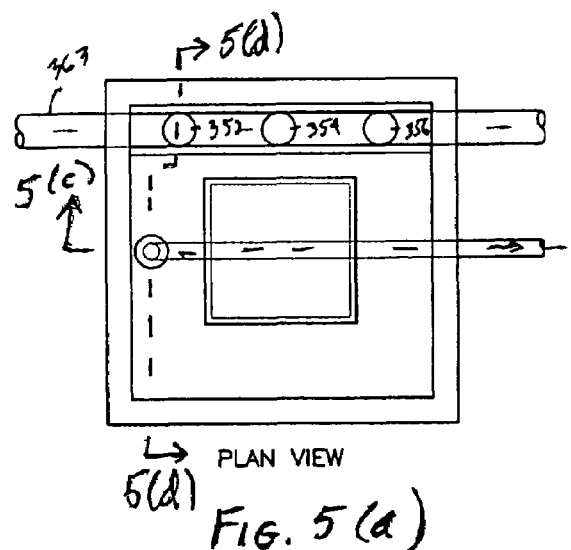
FIGS. 5(a), 5(b), 5(c) and 5(d) is a plan view, a cutaway perspective view, and two section views, respectively, of a third embodiment of a stormwater treatment container of the present invention.
Figure 5B:
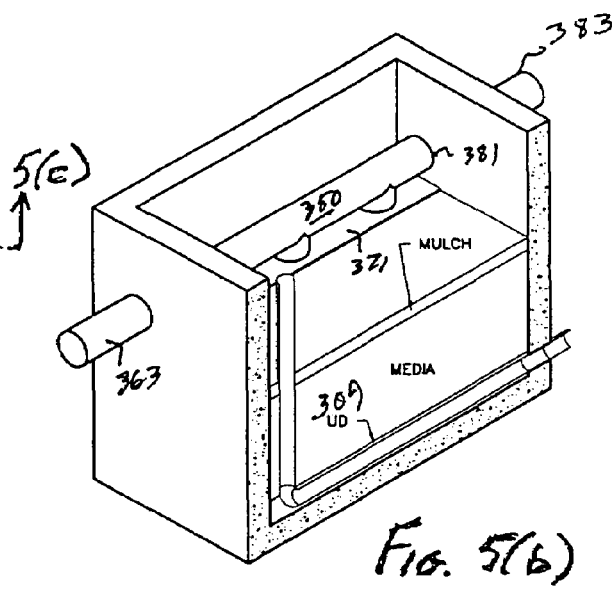
Figure 5C:
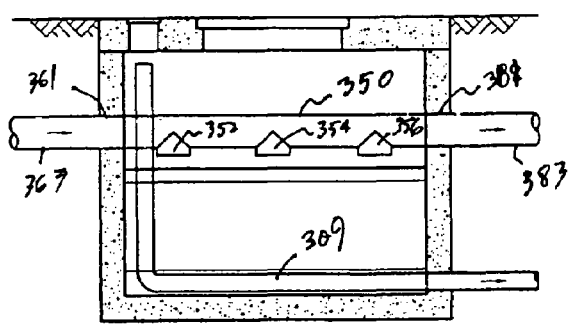
Figure 5D:
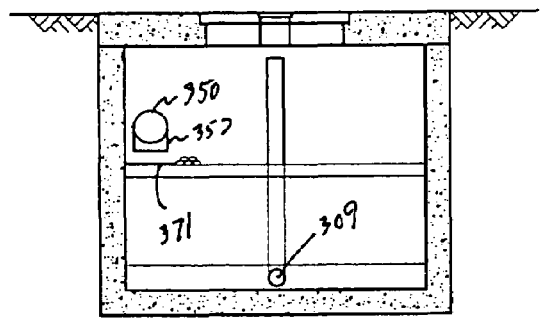

The present invention is distinguished by a bypass arrangement to be described. The present invention has particular utility when utilized with a building roof drain structure 61 wherein stormwater from the roof is directed down a vertical pipe 63, as best shown in FIG. 2, into an inlet pipe opening into the stormwater bioretention treatment chamber of the present invention. As is shown schematically in FIG. 2, the underdrain pipe 65, as well as the bypass or overflow outlet pipe 67, are provided to the storm sewer system, either separately or through additional catch basins. The overflow pipe and underdrain pipe could interconnect at some downstream location prior to entering the storm sewer system. In addition, it should be recognized that although only a single treatment chamber is depicted in FIG. 2, multiple treatment chambers positioned around or near a building can be provided. The treatment chambers are positioned below ground level similar to the treatment chamber of FIG. 1 and plant material grows out of a centrally located tree grate.

A first embodiment of the present invention is depicted in FIGS. 3(a)-3(d). A stormwater treatment system is depicted comprising a substantially water impermeable treatment container 101, preferably made of concrete. The treatment container 101 includes sidewalls 141, 143, 145, 147, a bottom wall 111, and a top slab 125 that is at least partially open to the atmosphere. Centrally disposed in the top slab is an opening 126 through which a tree grate (not shown) is inserted. This is similar to the tree grate 27 shown in FIG. 1. Plant material can grow out of the opening into the atmosphere. The container size is similar in plan view to the prior art container of FIG. 1, but preferably is taller from top to bottom by about 2' to accommodate the inlet and outlet pipe openings to be described. Filter media 103, i.e., a soil mixture 107, is located within the container along with a mulch layer 105 overlying the soil mixture. The filter media is designed to be effective for bioretention and may be that described in the Coffman patents incorporated by reference herein. It is an important aspect of the present invention that the mulch and media, along with the plant material that grows therein, be part of a bioretention system that filters the stormwater that flows into the treatment container in a manner as described in the Coffman patents incorporated herein by reference.

Positioned through one sidewall 145 is a stormwater inlet pipe opening 161 interconnected with a stormwater inlet pipe 163. The stormwater inlet pipe 163 receives the stormwater to be treated and, preferably, is connected with a vertically oriented roof drain structure 61 as shown in FIG. 2. Positioned in the container 101 is a dissipation or deflector plate 171 extending from a sidewall 145 horizontally or substantially horizontally across the full length of the chamber adjacent the overflow or bypass outlet pipe opening 181 that communicates with an overflow outlet pipe 183. The dissipation plate 171 extends from the sidewall 143 a distance toward the center of the chamber beyond the opening of the inlet and outlet pipe openings 161, 181. The dissipation plate 171 should be wide enough so that all of the stormwater that falls from the inlet opening 161 will fall onto the plate 171. As depicted in FIGS. 3(*a*)-(*d*), the dissipation plate 171 is horizontal, i.e., parallel to the bottom wall 111 of the container 101. It can also be angled slightly downwardly to assist in enabling the stormwater that enters through the inlet pipe opening 161, falling upon the dissipation plate 171, to fall into the treatment chamber 101 above the mulch layer 105. The filter media 103, including the mulch layer 105, extends from the bottom wall 111 substantially up to, i.e., not greater than, the level of the dissipation plate free edge 173. Positioned on top of the mulch layer 105 adjacent the free edge 173 of the dissipation plate 171 is a relatively narrow layer of rocks 190 (6" to 8" in width) through which the stormwater seeps therethrough onto the mulch layer. As is known in the art, stormwater can seep through the mulch 105 and soil mixture 107 and pass through openings (not shown) in the underdrain pipe 109 and outward through the underdrain pipe opening 131 into a pipe 151 that leads to the sewer drainage system, as described in the Coffman patents incorporated by reference herein.

When stormwater flow rates are high, i.e., exceed the capacity of the treatment chamber to treat the stormwater, the level of the stormwater in the treatment chamber will rise and, at a certain point, will rise to the level of the overflow pipe opening 181. At such rates, stormwater will exit the treatment chamber through the overflow/bypass outlet pipe opening 181, and will be at least partially untreated. The untreated overflow/bypass stormwater exits through the overflow/bypass outlet opening 181 and pipe 83 which, in turn, is connected to the storm sewer system.

The underdrain pipe 109 may be connected to a vertical cleanout pipe 121 that allows access to the underdrain system by a conventional snake mechanism to clean out the underdrain system. A separate plate 123 is provided for access to the vertically oriented cleanout pipe. The cleanout pipe 123 is optional.

A second embodiment of the stormwater bioretention treatment system is depicted in FIGS. 4(*a*)-4(*d*). For convenience, similar numerals are provided prefaced by the numeral "2" and the description will not be repeated. Suffice it to say that this embodiment differs from the embodiment of FIG. 3 by the use of vertically oriented flow direction plates 272, 274 at opposite free edges of the dissipation plate 271 defining a slot or gap opening 276 therebetween. These assist in flow control and the upstanding vertical plates 272, 274 create a hydraulic wall. In this embodiment, the dissipation or deflector plate 271 is angled or pitched downwardly from sidewall 244. It should be appreciated that this plate 271 could also be substantially horizontally angled as with the dissipation plate of FIG. 3. The use of the upstanding flow direction plates 272, 274 defining a gap or slot 276 creates an eddy effect or vortex.

The third embodiment is depicted in FIGS. 5(*a*)-5(*d*) with similar components prefaced by numeral "3". This differs from the previous embodiments in that a separate horizontally oriented interior overflow/bypass pipe 350 connects the inlet opening 361 with the outlet opening 381. The interior pipe 350 includes a plurality of downwardly oriented openings 352, 354, 356 above the dissipation plate 371. As shown in FIG. 5, three downwardly oriented openings are provided; however, it should be appreciated that this number could be less than or greater than three depending upon the hydraulic conditions. In this embodiment, as the stormwater flows exceed the capacity of the system to filter the stormwater, stormwater will rise vertically in the container to a level that reaches the openings 352, 354, 356 and all additional stormwater flows will bypass the treatment chamber and go directly to the overflow or bypass outlet opening 381 through the outlet opening pipe 383 and into the storm drain system. It is noted that the diameter of the downwardly oriented openings 352, 354, 356 are depicted as substantially equal to each other. However, the diameters could vary and go from smaller to larger in a downstream direction, or vice versa, depending upon the intended hydraulic design.

Still another embodiment is depicted in FIGS. 6(*a*)-6(*e*) with similar components prefaced by the numeral "4". In this embodiment, the overflow outlet opening 481 is adjacent the bottom wall 411 of the container and is interconnected with the interior overflow/bypass pipe 450 through a vertically oriented pipe 460 that extends through the dissipation plate 471. In this embodiment, the overflow/bypass outlet opening 481 is combined with the underdrain pipe outlet opening 431. As in the embodiment of FIG. 5, high flow rates through the inlet pipe opening will bypass the treatment chamber and extend directly, in this case, downwardly to the outlet pipe opening.

Figure 7B:
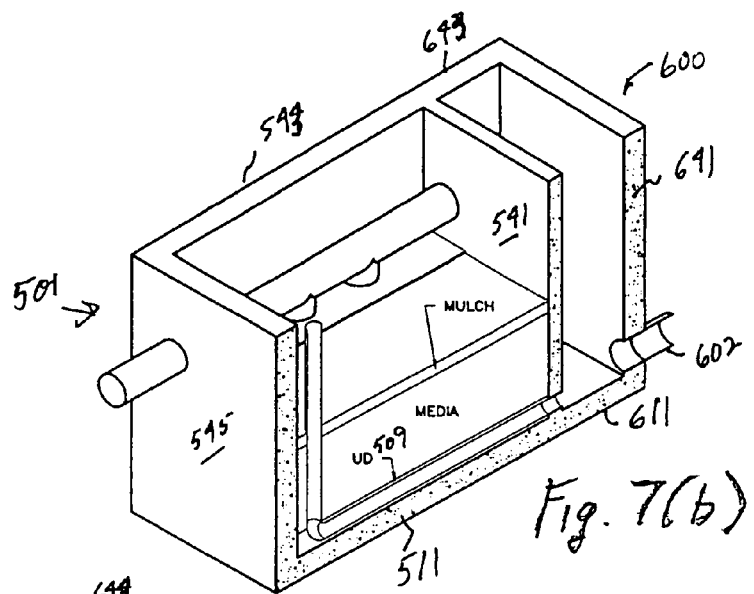
FIGS. 7(a), 7(b), 7(c) and 7(d) is a plan view, a cutaway perspective view and two sectional views, respectively, of a stormwater treatment container with an integral collection chamber.
Figure 7A:
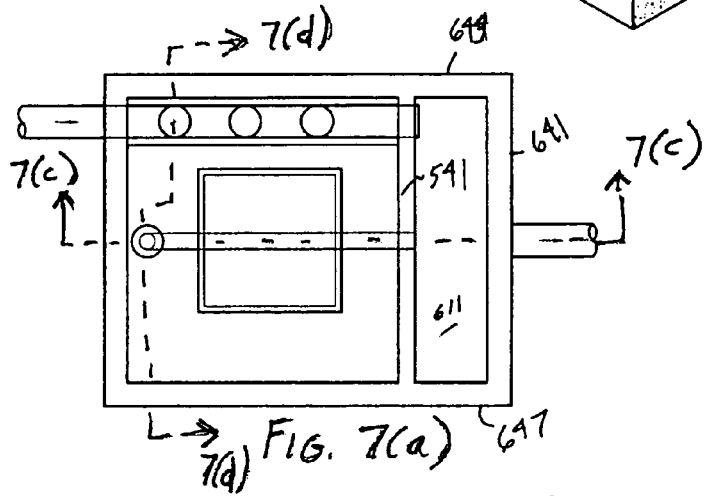
Figures 7C, 7D:
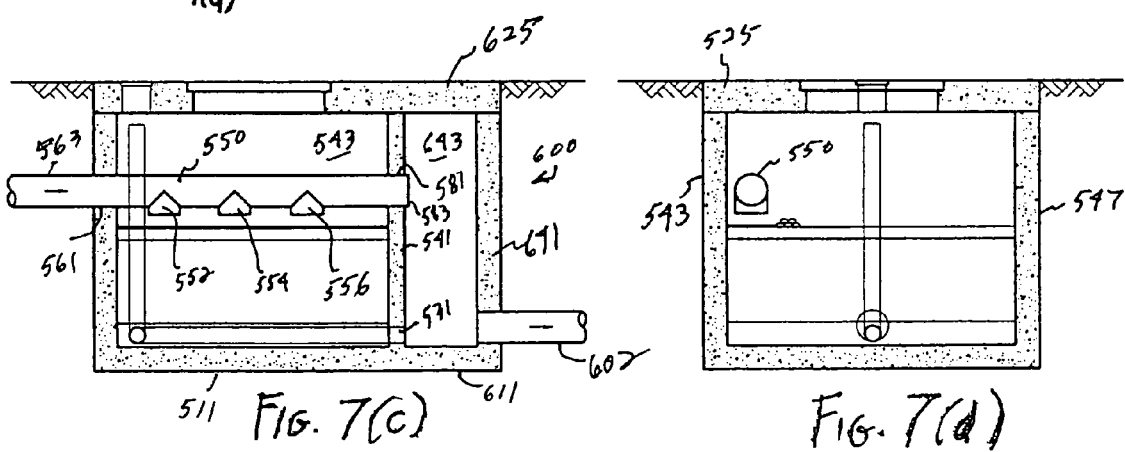

FIGS. 7(*a*)-7(*d*) depict yet another embodiment with similar components prefaced by the numeral "5". In this embodiment, the treatment container 501 is associated with a separate collection chamber 600 that includes a bottom wall 611 and sidewalls 641, 643, 647, 541, at least one of the sidewalls of which is the exterior wall 541 of the container 601. The treatment container 501 itself, in the embodiment depicted in FIG. 7, is similar to the embodiment shown in FIG. 5. It should be appreciated, however, that the collection chamber 600 could be associated with any of the previously described treatment container embodiments. The collection chamber 600 receives treated stormwater from the underdrain pipe 509, as well as bypass or overflow water from the overflow/bypass pipe 583. From the collection chamber 600, a collection chamber outlet 602 is provided that is associated or connected with the sewer system. The top wall 625 of the collection chamber 600 is fully enclosed by the top slab.

In the above embodiments, the mulch layer may be three inches and the filter media is 21"-24", with the container height approximately 5'. The underdrain pipe may be within the filter media or, alternatively, there may be a layer of stone or rocks that extend to a height from the bottom wall to rise just above the underdrain pipe. The typical treatment capacity is approximately 0.35 inches of rainfall intensity per hour. This, of course, depends upon the size of the treatment chamber. In any event, flow rates in excess of this capacity will bypass or overflow the system through one of the embodiments described above. The treatment chamber is preferably installed close to the building, but could be located anywhere so long as it is interconnected with the vertically oriented roof drain structure. The chamber or container is shown in the embodiments described above as square or rectangular, but it should be appreciated that they could also be cylindrical in shape.

The foregoing descriptions and drawings should be considered as illustrative only of the principles of the invention. As noted, the invention may be configured in a variety of shapes and sizes and is not limited by the dimensions of the preferred embodiments. Numerous applications of the present invention will readily occur to those skilled in the art. Therefore, it is not desired to limit the invention to the preferred embodiments or the exact construction or operation shown and described. Rather, all suitable modifications and equivalents may be resorted to falling within the scope of the invention.

What is claimed is:

1. A stormwater treatment system comprising a substantially water impermeable treatment container having an enclosed side wall, a bottom wall, and at least a partially open top to define a container interior, said partially open top including a substantially water impermeable top slab defining an opening substantially centrally of said top slab with a grate mounted therein through which plant material may grow out, an underdrain pipe located substantially horizontally in proximity to said bottom wall and exiting said container through an underdrain pipe opening in said side wall, said underdrain pipe including a plurality of perforations to receive treated stormwater, a stormwater inlet pipe communicating through an inlet pipe opening in said side wall at a location closer to said top than to said bottom wall, and an overflow/bypass outlet pipe communicating through an outlet pipe opening in said side wall, said overflow/bypass outlet pipe receiving at least partially untreated stormwater that flows through said inlet pipe at rates in excess of that capable of treatment within said container, said inlet pipe opening and said outlet pipe opening closer to a side wall in plan view than to said substantially central opening of said top slab, a substantially horizontally oriented dissipation plate within said container and located below the position of said inlet pipe opening to receive stormwater flowing through said inlet pipe opening and dissipating the stormwater before it falls into the treatment container interior located below said dissipation plate, wherein said treatment container is positionable below ground level with said partially open top in communication with the atmosphere, said container interior including a filter media that fills the container to a level no higher than the level of the dissipation plate, said filter media comprising a layer of mulch overlying a soil mixture of non-organic and organic material and live plant material growing in the filter media, said plant material capable of growing out through the top of the container above ground level, and wherein said dissipation plate extends from a side wall a distance toward the center of the container to lie below the entire inlet pipe opening and having a free edge, said filter media within the container interior extending up no higher than said free edge, and further comprising a horizontally oriented interior overflow/bypass pipe extending from said inlet pipe opening and communicating with said outlet pipe opening, said interior overflow/bypass pipe including a plurality of downwardly directed openings oriented above and spaced from said dissipation plate so that stormwater through said interior overflow/bypass pipe will fall through said downwardly directed openings onto said dissipation plate and into the container interior, and wherein said outlet pipe opening is substantially level with said inlet pipe opening and said interior overflow/bypass pipe extends substantially horizontally from said inlet pipe opening to said outlet pipe opening so as to enable high stormwater flow through said stormwater inlet pipe into said interior overflow/bypass pipe to bypass the filter media and exit directly through said outlet pipe opening, said dissipation plate extending substantially horizontally and parallel with said overflow/bypass pipe and closer to a said wall in plan view than to said substantially central opening of said top slab.

2. The stormwater treatment system of claim 1, wherein said stormwater inlet pipe is connectable to a roof drain structure that receives stormwater from a roof of a building.

3. The stormwater treatment system of claim 1, wherein a narrow layer of rocks lies on said mulch layer adjacent said free edge of said dissipation plate.

4. The stormwater treatment system of claim 1, wherein said dissipation plate includes a vertically oriented wall extending upward from said free edge of said dissipation plate.

5. The stormwater treatment system of claim 4, wherein said dissipation plate includes a pair of vertically oriented walls spaced apart from each other to define a slot through which stormwater will fall off the dissipation plate into the container interior therebelow.

6. The stormwater treatment system of claim 1, wherein said outlet pipe opening and said underdrain pipe opening share a common opening that lies in proximity to said bottom wall.

7. The stormwater treatment system of claim 6, wherein said interior overflow/bypass pipe extends through said dissipation plate in a direction downward toward said bottom wall and is in communication with said outlet pipe opening.

8. The stormwater treatment system of claim 1, further comprising a collection chamber integral with said container and located outside the container interior adjacent a side wall, said outlet pipe opening and underdrain pipe opening in fluid communication with said collection chamber, said collection chamber having enclosed side walls, one of which is the container side wall exterior, and a chamber bottom wall, said chamber side walls coterminous with the height of the container side wall, said chamber further including an enclosed chamber top wall, said chamber further including a chamber outlet opening positioned in proximity to said bottom wall, wherein said chamber serves to collect the treated and untreated stormwater from said outlet pipe opening and underdrain pipe opening prior to the stormwater exiting through said chamber outlet pipe opening.

* * * * *